(12) United States Patent
Meng

(10) Patent No.: US 10,830,971 B2
(45) Date of Patent: Nov. 10, 2020

(54) ELECTROMAGNETIC INTERFERENCE EMISSION REDUCTION FOR OPTICAL MODULES

(71) Applicant: Lumentum Operations LLC, Milpitas, CA (US)

(72) Inventor: Jian Meng, Kanata (CA)

(73) Assignee: Lumentum Operations LLC, Milpitas, CA (US)

( * ) Notice: Subject to any disclaimer, the term of this patent is extended or adjusted under 35 U.S.C. 154(b) by 130 days.

(21) Appl. No.: 16/011,361

(22) Filed: Jun. 18, 2018

(65) Prior Publication Data

US 2019/0170954 A1   Jun. 6, 2019

Related U.S. Application Data

(60) Provisional application No. 62/594,174, filed on Dec. 4, 2017.

(51) Int. Cl.
 *G02B 6/42* (2006.01)
 *H01P 1/207* (2006.01)
 *H01P 1/202* (2006.01)
 *H01P 1/162* (2006.01)

(52) U.S. Cl.
 CPC ......... *G02B 6/4277* (2013.01); *G02B 6/4292* (2013.01); *H01P 1/162* (2013.01); *H01P 1/202* (2013.01); *H01P 1/207* (2013.01)

(58) Field of Classification Search
 None
 See application file for complete search history.

(56) References Cited

U.S. PATENT DOCUMENTS

| | | | | |
|---|---|---|---|---|
| 6,206,582 | B1 * | 3/2001 | Gilliland | G02B 6/4277 |
| | | | | 385/139 |
| 6,856,769 | B1 * | 2/2005 | Steffensen | G02B 6/4246 |
| | | | | 385/94 |
| 2005/0036747 | A1 * | 2/2005 | Togami | G02B 6/4245 |
| | | | | 385/92 |
| 2008/0145004 | A1 * | 6/2008 | Ice | G02B 6/4201 |
| | | | | 385/92 |

* cited by examiner

*Primary Examiner* — Chad H Smith
(74) *Attorney, Agent, or Firm* — Harrity & Harrity, LLP

(57) ABSTRACT

An optical module may include an optical subassembly having a receptacle. The receptacle may have a first diameter. The optical module may include a housing having a circular opening for receiving the receptacle. The circular opening may have a second diameter. The first diameter and the second diameter may be sized to reduce electromagnetic interference at a cut-off frequency from the optical module. The cut-off frequency may be defined by a data rate of at least one component of the optical module.

20 Claims, 11 Drawing Sheets

| inner conductor diameter 2a (mm) | outer conductor diameter 2b (mm) | Cut off frequency (GHz) |
|---|---|---|
| 2.92 | 4.49 | 25.78 |
| 2.92 | 3.89 | 28.05 |
| 2.92 | 3.45 | 30.00 |
| 2.50 | 4.91 | 25.78 |
| 2.50 | 4.31 | 28.05 |
| 2.50 | 3.87 | 30.00 |

FIG. 3B

| Absorption (dB) | EMI Filter Length t (mm) | Absorption Factor | Wavelength (mm) | Frequency (GHz) | Cut off frequency (GHz) |
|---|---|---|---|---|---|
| 3.80 | 1.00 | 275.99 | 11.64 | 25.78 | 30.00 |
| 8.57 | 3.00 | 275.99 | 11.64 | 25.78 | 30.00 |
| 10.79 | 5.00 | 275.99 | 11.64 | 25.78 | 30.00 |
| 2.57 | 1.00 | 208.24 | 10.70 | 28.05 | 30.00 |
| 7.35 | 3.00 | 208.24 | 10.70 | 28.05 | 30.00 |
| 9.56 | 5.00 | 208.24 | 10.70 | 28.05 | 30.00 |
| 3.01 | 1.00 | 230.08 | 11.64 | 25.78 | 28.50 |
| 7.78 | 3.00 | 230.08 | 11.64 | 25.78 | 28.50 |
| 10.00 | 5.00 | 230.08 | 11.64 | 25.78 | 28.50 |
| 0.44 | 1.00 | 103.93 | 10.70 | 28.05 | 28.50 |
| 4.33 | 3.00 | 103.93 | 10.70 | 28.05 | 28.50 |
| 6.55 | 5.00 | 103.93 | 10.70 | 28.05 | 28.50 |

ELECTROMAGNETIC INTERFERENCE EMISSION REDUCTION FOR OPTICAL MODULES

RELATED APPLICATION(S)

This application claims priority under 35 U.S.C. § 119 to U.S. Provisional Patent Application No. 62/594,174, filed on Dec. 4, 2017, the content of which is incorporated by reference herein in its entirety.

TECHNICAL FIELD

The present disclosure relates to optical devices. More particularly, some aspects of the present disclosure relate to an electromagnetic interference emission reduction for optical modules, such as optical modules that include at least one optical subassembly (e.g., a transmit optical subassembly (TOSA), a receive optical subassembly (ROSA), and/or the like).

BACKGROUND

An optical communications system may include a set of optical modules to enable optical communications over optical fibers. For example, a first optical module may include a transmit optical subassembly (TOSA) to provide a beam and a second optical module may include a receive optical subassembly (ROSA) to receive the beam. In this way, the first optical module may transmit information to the second optical module. In some cases, a single optical module may include multiple optical sub-assemblies. For example, a first optical module may include a first TOSA and a first ROSA, and may be termed a transmit-receive optical subassembly (TROSA), and a second optical module may include a second TOSA and a second ROSA. In this case, a first optical module may provide a first beam to a second optical module, and the second optical module may receive the first beam and provide a second beam to the first optical module. In this way, the first optical module may communicate with the second optical module, and the second optical module may communicate with the first optical module.

An optical subassembly, such as a transmit optical subassembly or a receive optical subassembly, may include a receptacle at an end of the optical subassembly. The receptacle may enable the optical subassembly to be coupled to another component, such as to an optical fiber, to another optical device, to an electrical device (e.g., a communications controller), and/or the like. An optical module may include a housing to house one or more optical subassemblies, and the housing may include one or more openings to enable one or more receptacles of the one or more optical subassemblies to couple to one or more other components outside the housing. Electromagnetic interference may be emitted by the optical subassembly through the receptacle. The opening in the housing may be configured based on a circular waveguide model, a rectangular waveguide model, a polygonal waveguide model, and/or the like to suppress emission of electromagnetic interference through the receptacle.

SUMMARY

According to some possible implementations, an optical module may include an optical subassembly having a receptacle. The receptacle may have a first diameter. The optical module may include a housing having a circular opening for receiving the receptacle. The circular opening may have a second diameter. The first diameter and the second diameter may be sized to reduce electromagnetic interference at a cut-off frequency from the optical module. The cut-off frequency may be defined by a data rate of at least one component of the optical module.

According to some possible implementations, an optical module may include a first optical subassembly to optically couple to a first optical fiber. The optical module may include a second optical subassembly to optically couple to a second optical fiber. The optical module may include a housing with a plurality of circular openings. The optical module may include a first electromagnetic interference filter associated with the housing and the first optical subassembly. The optical module may include a second electromagnetic interference filter associated with the housing and the second optical subassembly. The plurality of circular openings may include a first circular opening to receive the first electromagnetic interference filter and a second circular opening to receive the second electromagnetic interference filter. A first length of the first electromagnetic interference filter may be different from a second length of the second electromagnetic interference filter to cause a particular phase offset between the first optical subassembly and the second optical subassembly. The particular phase offset may be to cause first electromagnetic interference from the first optical subassembly to destructively interfere with second electromagnetic interference from the second optical subassembly such that a net electromagnetic interference from the optical module at a particular wavelength is less than a threshold amount.

According to some possible implementations, a method may include determining a cut-off frequency for an optical module. The method may include determining a first diameter for a housing of the optical module and a second diameter for an optical subassembly of the optical module based on the cut-off frequency for the optical module and a coaxial model for electromagnetic interference. The first diameter and the second diameter may be selected such that electromagnetic interference emitted by the optical module is above the cut-off frequency. The method may include manufacturing the optical module, such that the housing of the optical module includes at least one opening of the first diameter to receive a receptacle of the optical subassembly of the second diameter.

BRIEF DESCRIPTION OF THE DRAWINGS

FIGS. 3A-3C are diagrams of example implementations described herein;

DETAILED DESCRIPTION

Figure 1:
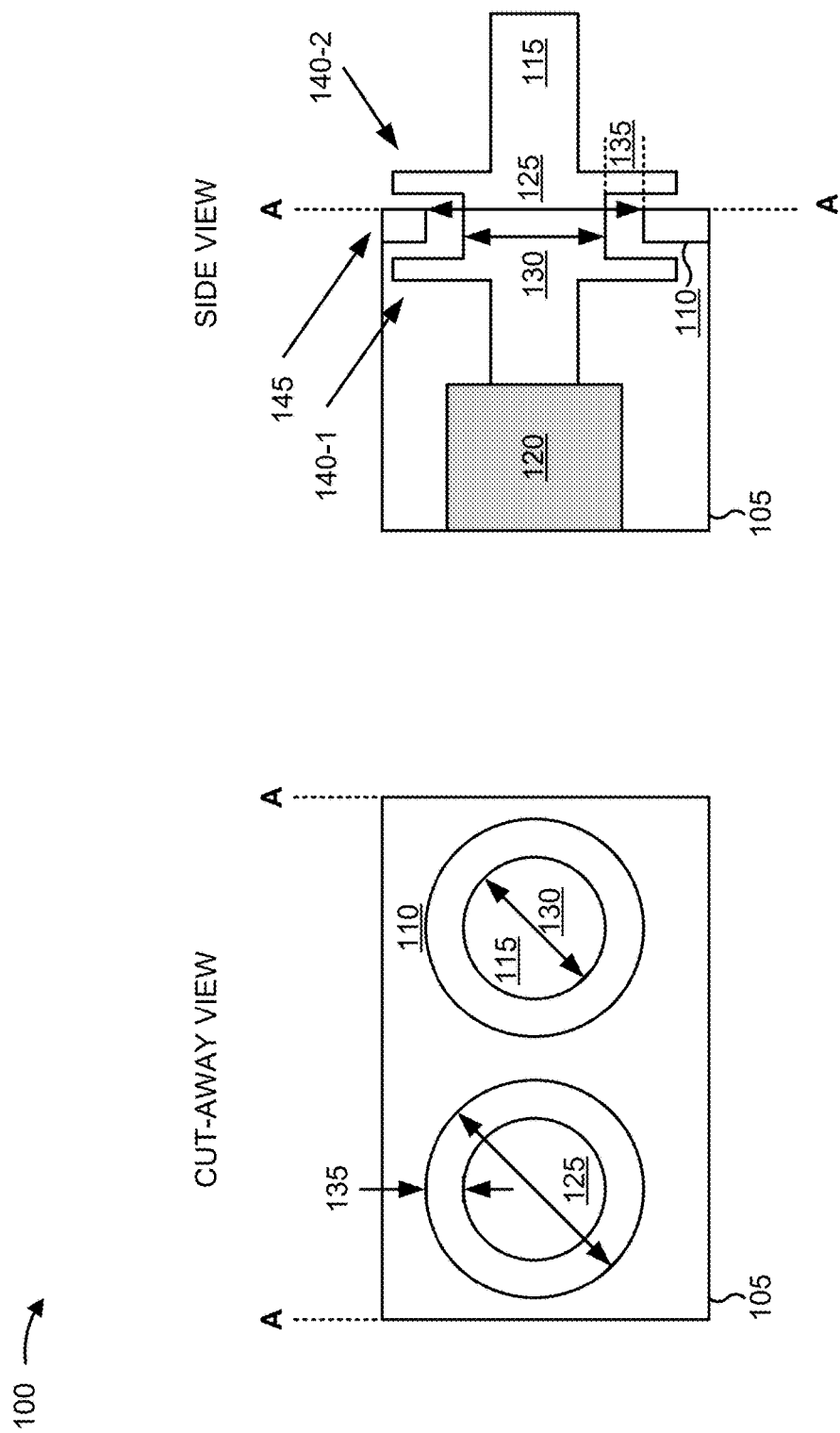
FIG. 1 is a diagram of an overview of an example implementation described herein.

The following detailed description of example implementations refers to the accompanying drawings. The same reference numbers in different drawings may identify the same or similar elements.

An optical communications system may include an optical module that includes at least one optical subassembly. For example, the optical module may include a housing to house the at least one optical subassembly, and an optical subassembly disposed inside the housing. The housing may include an opening to enable the optical subassembly to couple to, for example, an optical fiber to provide a beam (e.g., for a transmit optical subassembly (TOSA)), receive a beam (e.g., for a receive optical subassembly (ROSA)), and/or the like. Some optical modules, which may be termed transmit-receive optical subassemblies (TROSAs), may include both a TOSA to provide a beam, and a ROSA to receive a beam.

An optical subassembly may be configured to be grounded to electrically isolate radio frequency signals associated with circuitry of the optical module. However, in some cases, a ground path for a housing of the optical module may be insufficient to ground the optical module and one or more optical subassemblies thereof. Additionally, or alternatively, adding a ground path may result in excessive cost, manufacturing complexity, form factor, and/or the like. As a result, the one or more optical subassemblies may become signal paths for high frequency noise exiting the optical module (e.g., noise associated with greater than a threshold frequency). In this case, electromagnetic interference may exit the housing of the optical module via an opening of the housing of the optical module and a receptacle disposed in the opening of the housing of the optical module. This electromagnetic interference (EMI) leakage from the optical module may degrade performance of the optical module and/or other components in an optical communications system, and may fail to meet one or more performance criteria for the optical communications system.

Some implementations, described herein, provide for electromagnetic interference emission blocking for an optical module. For example, the optical module may include a housing with an opening of a first diameter, and an optical subassembly with a receptacle to be disposed into the opening, where the receptacle has a second diameter. In this case, the first diameter and the second diameter may be selected to reduce electromagnetic interference at a cut-off frequency for the optical module. Additionally, or alternatively, the housing may include a set of openings to receive a set of receptacles of a set of optical subassemblies, and the set of openings may be disposed to cause a particular phase offset between electromagnetic interference emissions associated with the set of optical subassemblies. In this case, the particular phase offset may cause first electromagnetic interference associated with a first optical subassembly to destructively interfere with second electromagnetic interference associated with a second optical subassembly to cause a net electromagnetic interference emission from the optical module to be reduced to less than a threshold amount. In this way, an optical module may be configured with reduced electromagnetic interference emissions, thereby improving performance of an optical communications system, enabling the optical communications system to satisfy one or more performance criteria, and/or the like.

FIG. 1 is a diagram of an overview of an example implementation 100 described herein. FIG. 1 shows an example implementation 100 of an optical module 105 in a cut-away view and a side view.

As further shown in FIG. 1, optical module 105 may include a set of housing openings 110 and a set of receptacles 115 of a set of optical subassemblies 120. For example, a housing opening 110 may be a circular opening in a housing of optical module 105 that is configured to receive a receptacle 115 of an optical subassembly 120 with a circular cross-section. In some implementations, optical subassembly 120 may be a transmit optical subassembly, a receive optical subassembly, and/or the like. In some implementations, housing opening 110 may be associated with a first diameter 125, and receptacle 115 may be associated with a second diameter 130 that is smaller than first diameter 125. For example, receptacle 115 may be disposed into housing opening 110, which may result in a gap 135 between housing opening 110 and receptacle 115. For example, housing opening 110 may receive receptacle 115 with an air gap or a dielectric material gap separating a surface of housing opening 110 and receptacle 115.

In some implementations, receptacle 115 may be associated with multiple diameters at multiple positions along an axial length of receptacle 115. For example, as shown in the side view, receptacle 115 may be associated with a multiple diameter structure, such that a first portion of receptacle 115 (e.g., with diameter 130) is disposed axially aligned to housing opening 110, and such that a portion 140-1 and a portion 140-2 of receptacle 115 axially precede and succeed, respectively, a structure 145 of housing opening 110 to sandwich structure 145. In this way, portion 140-1 and portion 140-2 may maintain an axial position of receptacle 115 and optical subassembly 120 in the housing of optical module 105.

In this way, optical module 105 may emit reduced electromagnetic interference relative to another type of optical module based on diameters of receptacle 115 and housing opening 110 being sized to filter electromagnetic interference at and above a cut-off frequency.

As indicated above, FIG. 1 is provided merely as an example. Other examples are possible and may differ from what was described with regard to FIG. 1.

FIGS. 2A-2D are diagrams of an example implementation 200 of an optical module 205.

Figure 2A:
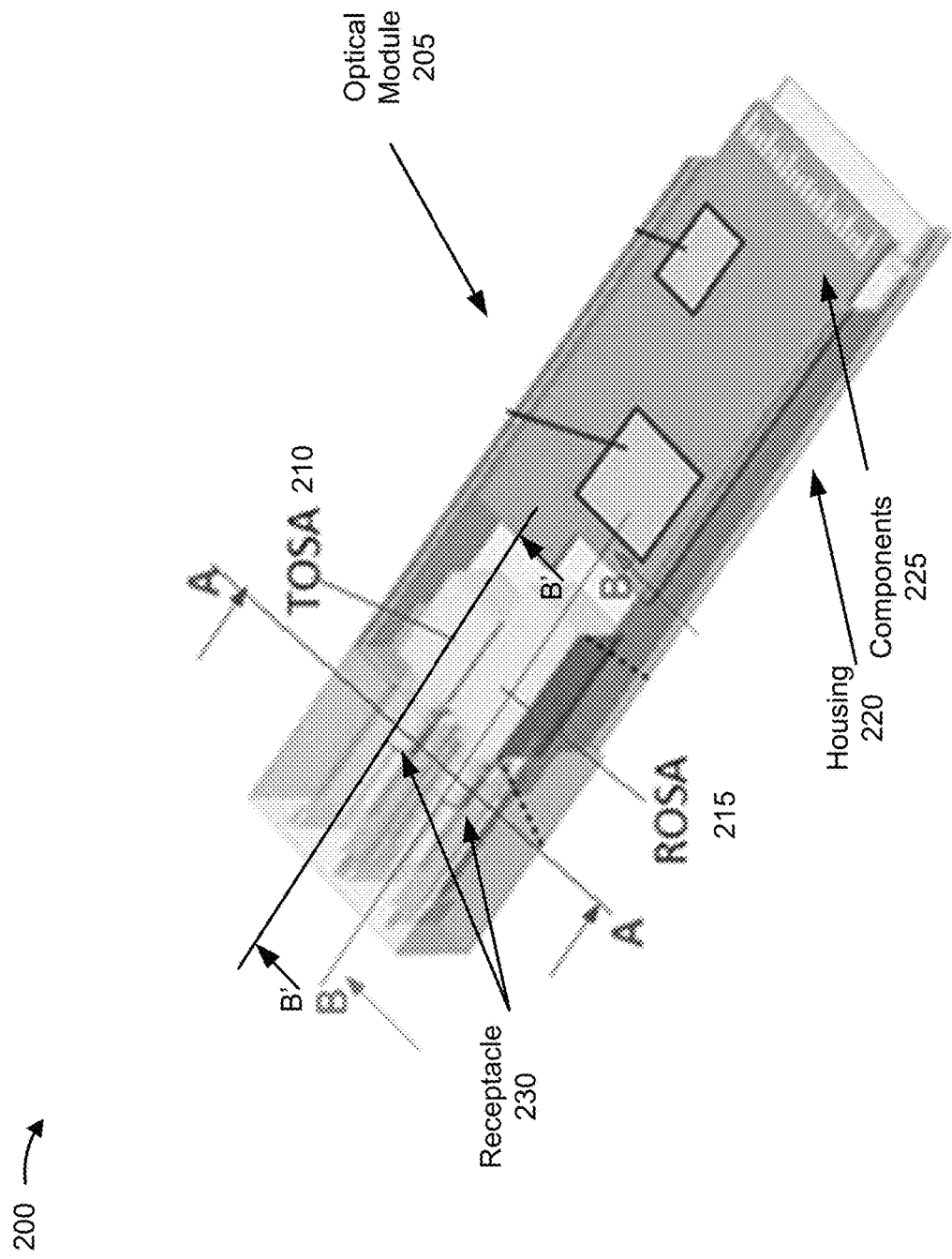
FIGS. 2A-2D are diagrams of example implementations described herein.

As shown in FIG. 2A, optical module 205 may include a transmit optical subassembly (TOSA) 210 and a receive optical subassembly (ROSA) 215. Transmit optical subassembly 210 and receive optical subassembly 215 may each be disposed into a housing 220. Housing 220 may encapsulate transmit optical subassembly 210, receive optical subassembly 215, components 225, and/or the like. In some implementations, components 225 may include a driver, a modulator, a processor, a switch, and/or another type of electrical component, optical component, or electro-optical component. In some implementations, transmit optical subassembly 210 and receive optical subassembly 215 may each include a receptacle 230. For example, receptacle 230 may extend from transmit optical subassembly 210 through an opening in housing 220 to couple transmit optical subassembly 210 to another component outside of housing 220, such as an optical fiber, an optical device, another optical module, and/or the like. Similarly, receptacle 230 may extend from receive optical subassembly 215 through an opening in housing 220 to couple receive optical subassembly 215 to another component outside of housing 220, such as an optical fiber, an optical device, another optical module, and/or the like.

Figure 2B:
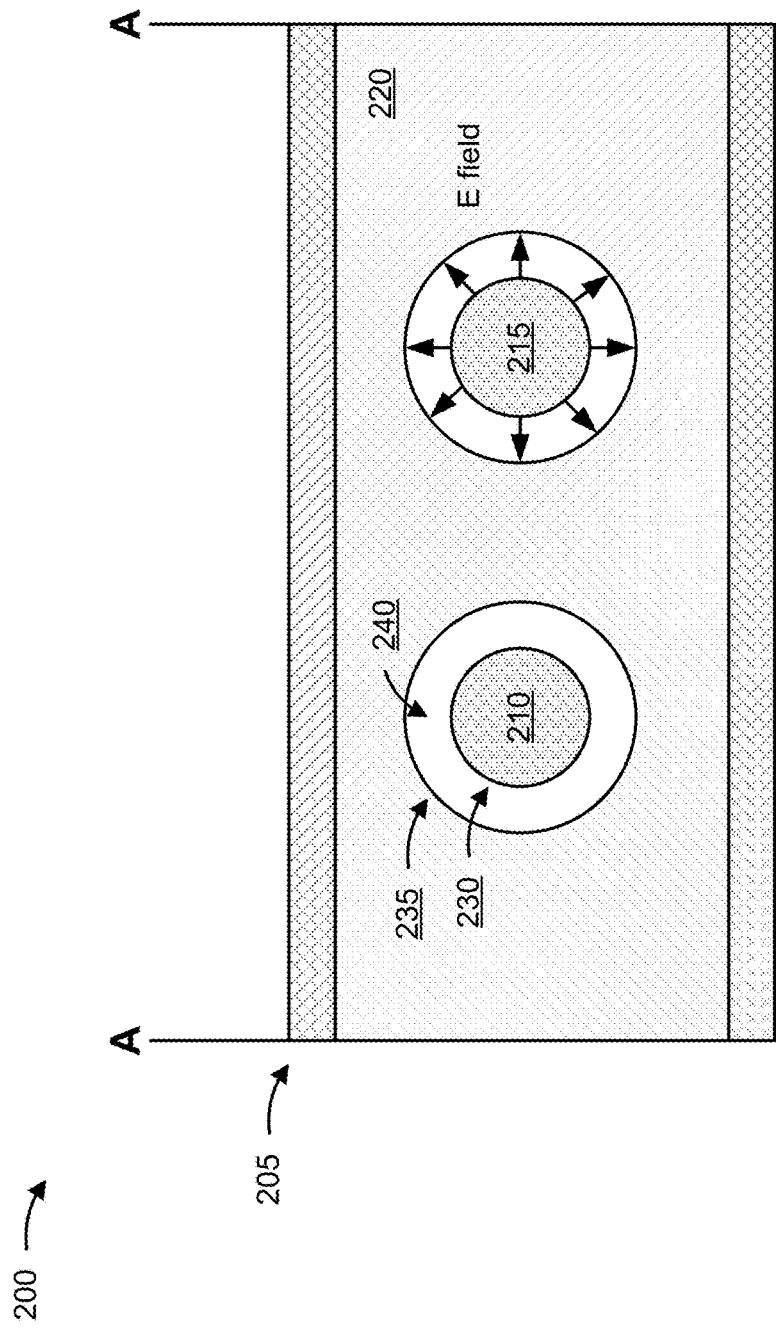

As shown in FIG. 2B, and in cut-away diagram AA, housing 220 may include opening 235 to receive receptacle 230. In some implementations, a surface of receptacle 230 and a surface of housing 220, which forms opening 235, may be separated by gap 240. For example, receptacle 230 and housing 220 may be separated by an air gap. Additionally, or alternatively, receptacle 230 and housing 220 may be separated by another material, such as another type of gas, a solid material gap, and/or the like. In some implementations, an electromagnetic field (E field) may extend radially from a center of an optical subassembly (e.g., receive optical subassembly 215) and an opening of housing 220. For example, the electromagnetic field may extend radially from the surface of a receptacle of receive optical subassembly 215 equivalently in all radial directions. In some implementations, electromagnetic interference forming the electromagnetic field may be in a transverse electromagnetic mode or quasi-transverse electromagnetic mode.

In some implementations, a first electromagnetic field extending radially from transmit optical subassembly 210 may be different from a second electromagnetic field extending radially from receive optical subassembly 215. For example, offset positions, sizes, and/or lengths of electromagnetic interference filters of receptacles of transmit optical subassembly 210 and receive optical subassembly 215 may result in respective electromagnetic fields being offset by a particular phase offset. In this case, the electromagnetic interference filters of the receptacles may be portions of the receptacles disposed into openings 235. In this case, for a 180 degree phase offset, the respective electromagnetic fields may destructively interfere to reduce a net electromagnetic interference emission from optical module 205. In some implementations, the net electromagnetic interference emission may be a far field electromagnetic interference emission from optical module 205, and may be less than a threshold amount as a result of a sizing of the receptacles, the openings in housing 220, the phase offset, and/or the like. For example, the net electromagnetic interference emission may be less than 75 decibel microvolts per meter (dBµV/m) at a measurement distance of, for example, 3 meters (m), less than 60 dBµV/m, less than 55 dBµV/m, less than 50 dBµV/m, less than 45 dBµV/m, and/or the like.

Figure 2C:
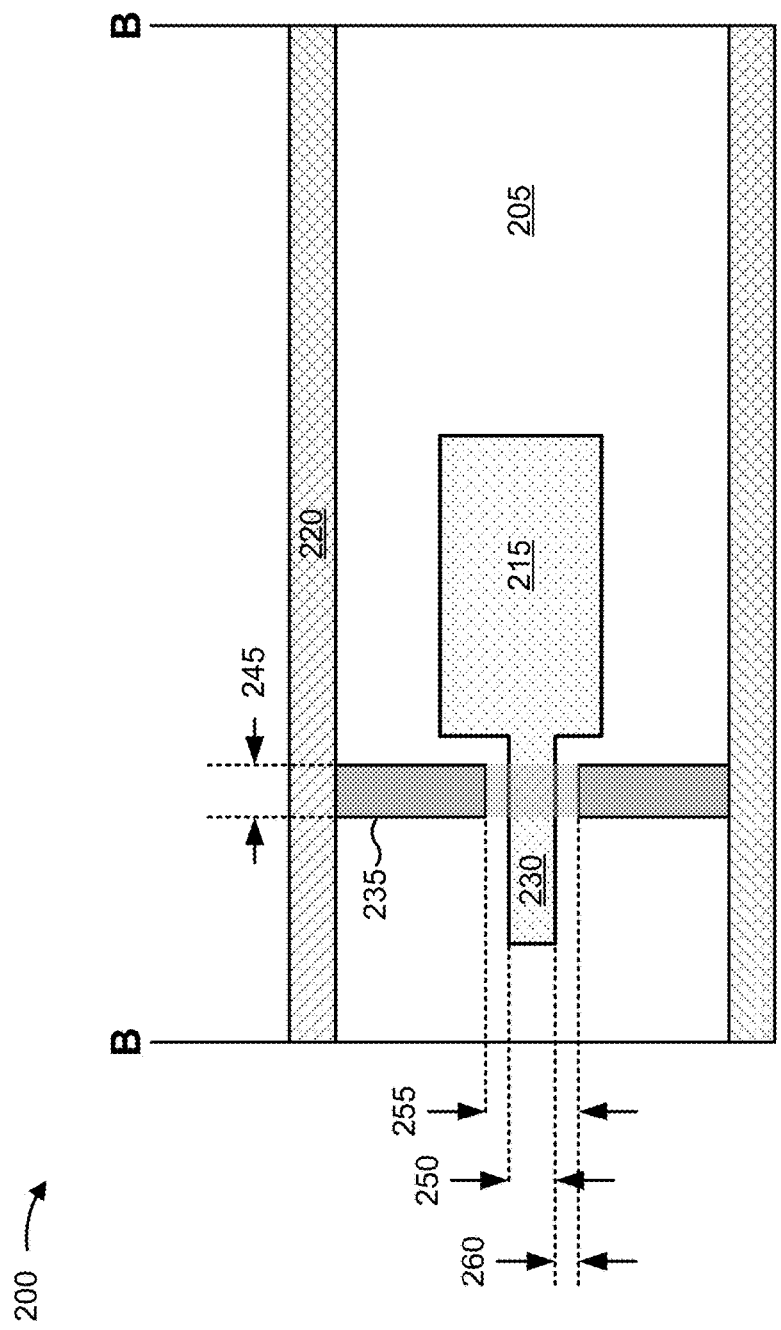

As shown in FIG. 2C, opening 235 may be associated with a thickness 245, which may be greater than a threshold to achieve a threshold level of signal attenuation to reduce electromagnetic interference leakage. For example, a portion of housing 220 may form a circular opening 235 and may provide a thickness 245 for opening 235. In some implementations, receptacle 230, opening 235, and gap 240 may be associated with particular diameters. For example, receptacle 230 may be associated with a circular cross section and a diameter 250, opening 235 may be associated with a circular cross section and a diameter 255, and gap 240 may be associated with a ring-shaped cross section defined by opening 235 and receptacle 230 and may be associated with a thickness 260 representing a separation between opening 235 and receptacle 230. In this way, based on the thickness 245, diameter 250, diameter 255, and thickness 260, an amount of electromagnetic interference exiting optical module 205 may be reduced relative to other shaped openings and configurations, thereby improving performance of optical module 205 without requiring optical module 205 to provide a ground for optical subassemblies 210 and 215.

Figure 2D:
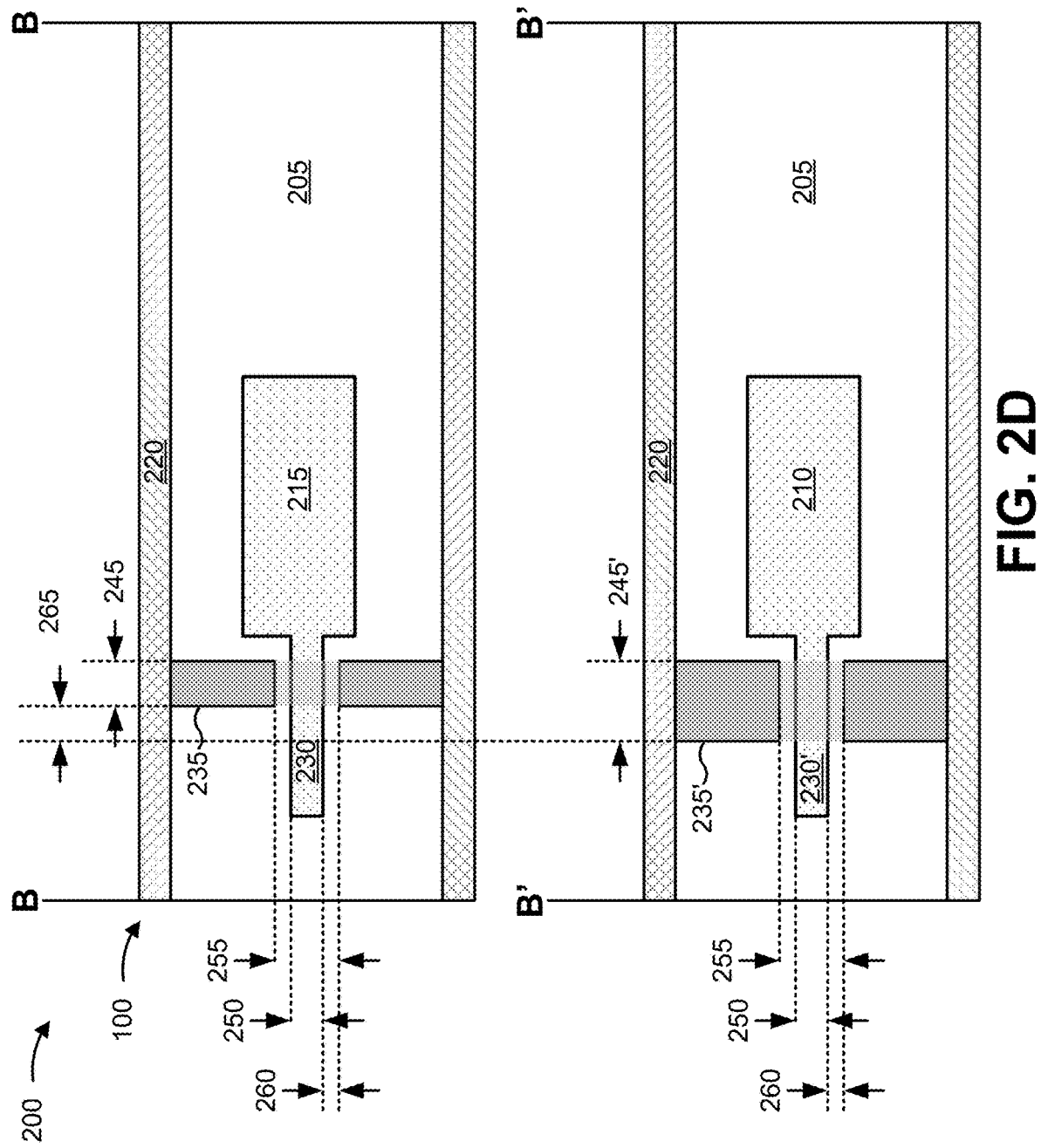

As shown in FIG. 2D, respective electromagnetic interference filters of optical subassembly 210 and optical subassembly 215 may be offset to cause electromagnetic interference emissions from optical subassembly 210 and optical subassembly 215, respectively, to have a phase offset. For example, a first receptacle 230 of optical subassembly 215 may be offset from a second receptacle 230' of optical subassembly 210 by an offset 265. Offset 265 may represent a different in a thickness of opening 235 into which receptacle 230 is inserted relative to a thickness of opening 235' into which receptacle 230' is inserted. In this case, offset 265 may be configured to cause a 180 degree phase offset between respective electromagnetic interference emissions, thereby resulting in first electromagnetic interference from optical subassembly 215 destructively interfering with second electromagnetic interference from optical subassembly 210.

In some implementations, the offset 265 offsetting optical subassemblies 210/215 and/or electromagnetic interference filters thereof may be configured by altering a relative length of electromagnetic interference filters of optical subassemblies 210/215, a relative thickness of opening 230/230' of housing 220, a relative positioning of optical subassemblies 210/215 and/or electromagnetic interference filters, and/or the like. In some implementations, the offset 265 may be configured to a half-wavelength thickness based on the cut-off frequency. For example, for cut-off frequencies of 25.78 GHz, 28.085 GHz, and 50.00 GH, offset 265 may be configured to be 5.82 mm, 5.35 mm, and 3.00 mm, respectively.

In this way, a net electromagnetic interference emission of optical module 205 is reduced to less than a threshold amount, such as less than 100 dBµV/m, less than 75 dBµV/m, less than 50 dBµV/m, and/or the like. In some implementations, the offset 265 may be configured to a half-wavelength thickness based on a peak electromagnetic interference emission frequency associated with optical module 205. For example, the offset 265 may be configured to a half wavelength of the peak electromagnetic interference emission frequency, thereby suppressing electromagnetic interference at a wavelength of the peak electromagnetic interference emission frequency.

As indicated above, FIGS. 2A-2D are provided merely as an example. Other examples are possible and may differ from what was described with regard to FIGS. 2A-2D.

Figure 3A:
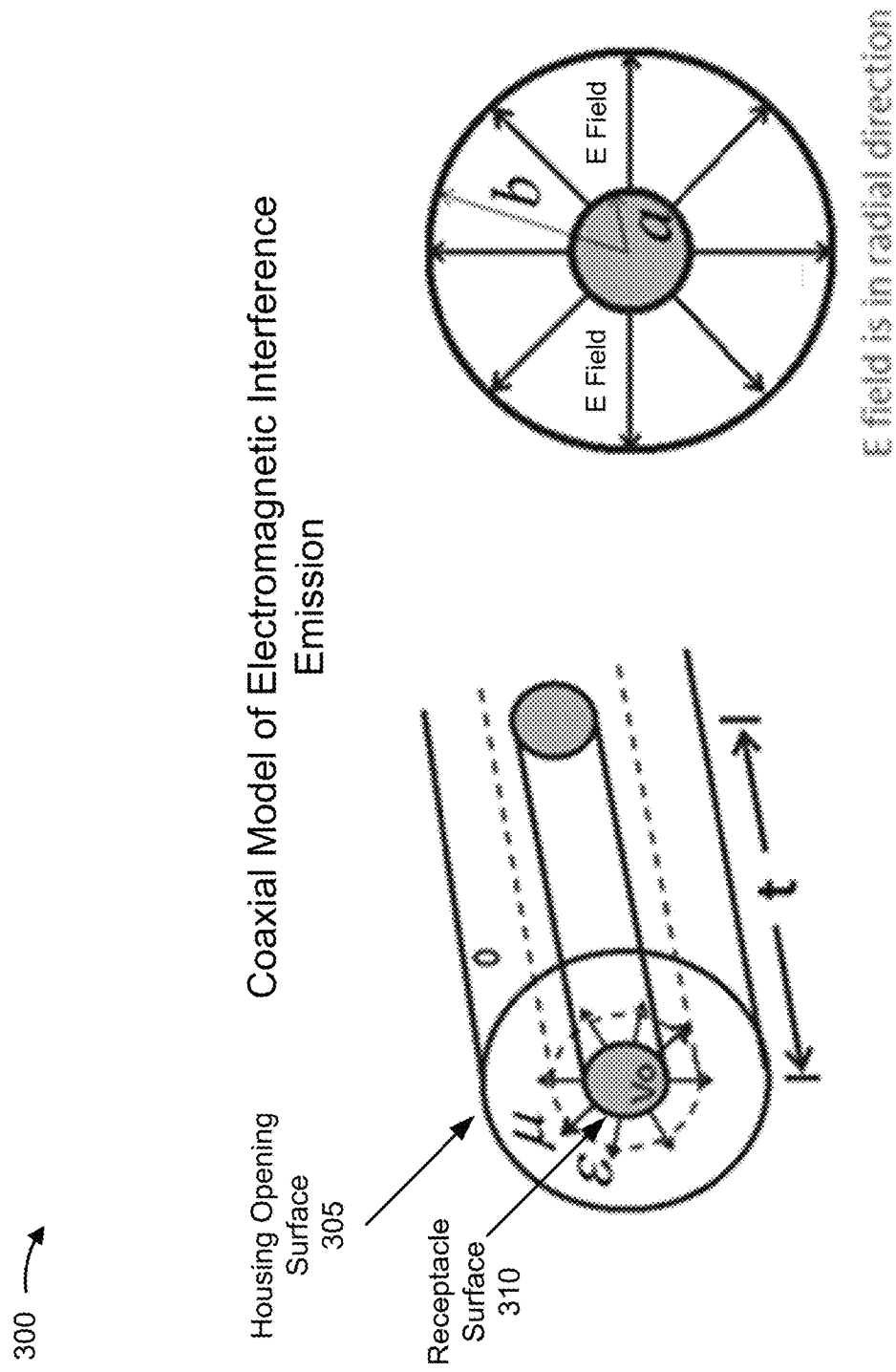

FIGS. 3A-3C are diagrams of an example implementation 300 of a coaxial model for configuring an optical module.

As shown in FIG. 3A, a coaxial model may be developed for calculating electromagnetic interference emission. As shown, the coaxial model may represent a receptacle of an optical subassembly as an inner conductor and an opening in a housing of the optical subassembly as an outer conductor using a coaxial cross-section and a thickness, t. For example, housing opening surface 305 may surround receptacle surface 310. In this case, the coaxial model may relate to one or more parameters, such as a dielectric coefficient of a gap between receptacle surface 310 and housing opening surface 305, $\epsilon$, which represents a permittivity of a media disposed in the gap (e.g., air), a parameter $\mu$, which represents a permeability of the media, $v_0$, which represents a voltage applied at the inner conductor, and/or the like. For example, the dielectric coefficient may be 1 when the gap is an air gap. In some implementations, the cut-off frequency may be defined by a data rate of at least one component of an optical module (e.g., at least one optical subassembly of the optical module), and may be calculated based on a set of geometric parameters of the optical module. For example, a cut-off frequency may be determined based on an equation:

$$f_c \approx \frac{2c}{(2a+2b)\pi\sqrt{\varepsilon_r}} \quad (1)$$

where $f_c$ represents a cut-off frequency, a represents an inner radius (e.g., of the receptacle), and b represents an outer radius (e.g., of the opening). In this case, for a receptacle of diameter 2.92 millimeters (mm) and a configured cut-off frequency of 25.78 Gigahertz (GHz), an outer diameter for the opening may be determined as 4.49 mm to achieve the configured cut-off frequency for a 100 Gigabit Ethernet (GbE) optical module with a particular set of dimensions. In some implementations, the data rate may be greater than a threshold, such as greater than 50 Gigabits per second (Gbps), 100 Gbps, 200 Gbps, 400 Gbps, and/or the like. In some implementations, the data rate may be a single optical subassembly data rate, a net data rate of multiple optical subassemblies, and/or the like. In some implementations, the cut-off frequency may be less than a particular threshold, such as less than 35 GHz, less than 30 GHz, less than 25 GHz, and/or the like.

As shown in FIG. 3B, and by chart 320, based on the coaxial model, a cutoff frequency may be determined for a set of inner conductor diameters and outer conductor diameters. For example, to maintain compatibility with other optical devices to which the receptacle is to couple, an inner conductor diameter of the receptacle may be maintained at a diameter of another optical device to which the receptacle is to couple (e.g., 2.92 mm, 2.50 mm, and/or the like). In this case, based on a configured cut-off frequency (e.g., 25.78 GHz, 28.05 GHz, and/or the like), a size for an outer conductor diameter of the opening may be configured and selected for manufacture (e.g., 4.49 mm, 3.89 mm, and/or the like). In some implementations, the inner conductor diameter may be associated with a particular range of diameters, such as between 2.0 mm and 3.0 mm (inclusive), and the outer conductor diameter may be associated with another, larger range of diameters, such as between 3.0 mm and 5.0 mm (inclusive) to achieve a configured cut-off frequency.

As shown in FIG. 3C, and by chart 340, based on the coaxial model, a cut-off frequency may be determined for a set of electromagnetic interference filter lengths, t. For example, as the interference filter length is increased, as described herein, by increasing a thickness of a housing wall, of a housing of the optical module, that includes a circular opening and that receives a circular receptacle, an absorption of electromagnetic interference is increased. An absorption factor for the coaxial model may be calculated based on an equation:

$$\alpha = \frac{2\pi}{\lambda_c}\sqrt{1-\left(\frac{f}{f_c}\right)^2} \quad (2)$$

where $\lambda_c$ represents a cut-off wavelength, $f_c$ represents a cut-off frequency, and f represents a frequency for which the absorption factor is to be calculated. In this case, for an absorption factor of 275.99, a wavelength of 11.64 mm, a frequency of 25.788, and a cut-off frequency of 30.00 GHz, thicknesses of 1.00 mm, 3.00 mm, and 5.00 mm correspond to absorptions of 3.80 dB, 8.57 dB, and 10.79 dB, respectively. In some implementations, the housing wall may be associated with a particular range of thicknesses to achieve a configured attenuation of electromagnetic interference emissions, such as a range of between 0.5 mm and 7.5 mm (inclusive), between 1 mm and 5 mm (inclusive), between 2.5 mm and 3.5 mm (inclusive), and/or the like. Based on configuring an optical module based on results of the coaxial model, a cut-off frequency may be determined to enable less than a threshold emission of electromagnetic interference.

As indicated above, FIGS. 3A-3C are provided merely as an example. Other examples are possible and may differ from what was described with regard to FIGS. 3A-3C.

Figure 4A:
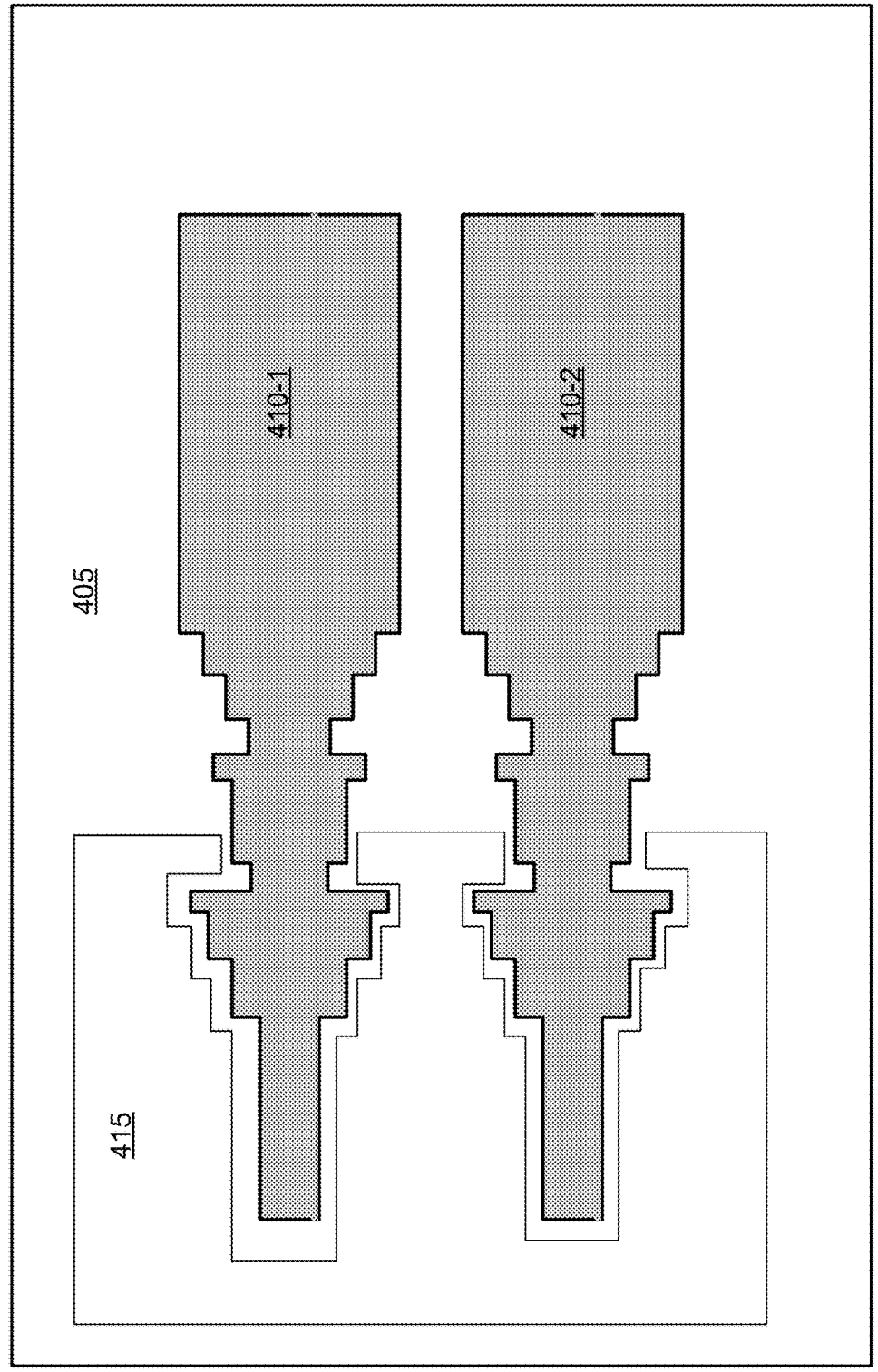
FIGS. 4A and 4B are diagrams of example implementations described herein.
Figure 4B:
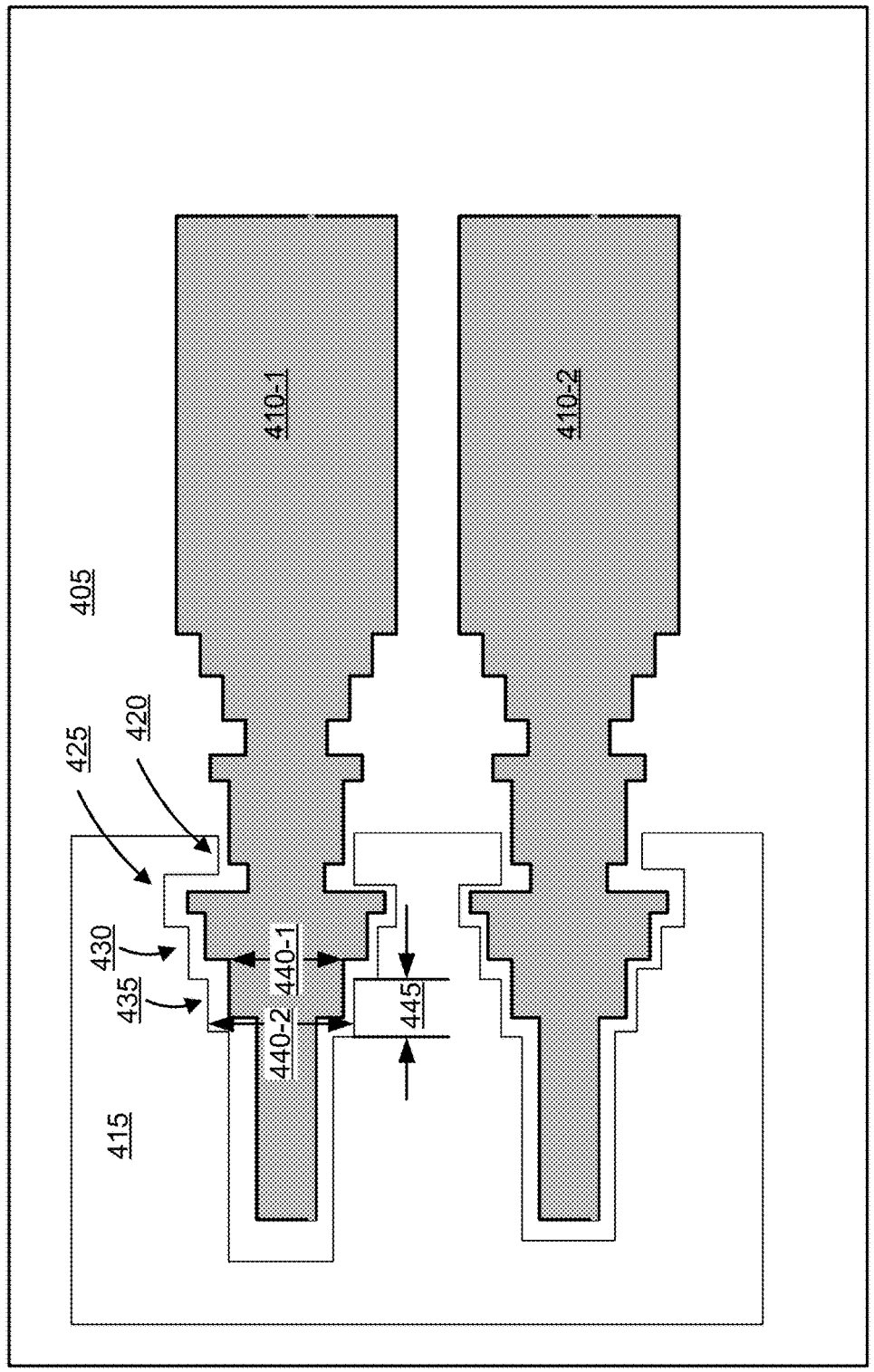

FIGS. 4A and 4B are diagrams of an example implementation 400 of an optical module.

As shown in FIG. 4A, optical module 405 includes a set of optical subassemblies 410-1 and 410-2 and a housing 415.

As shown in FIG. 4B, optical subassembly 410-1 includes a receptacle with multiple diameters aligned to multiple portions of an opening of housing 415. For example, at 420, a first portion of housing 415 with a circular cross section may be aligned to a first portion of the receptacle. Similarly, at 425, 430, and 435, portions of housing 415 may be aligned to portions of the receptacle with different cross sections. Collectively, the housing, at 430 and 420, may sandwich the receptacle at 425. In this way, the receptacle can be mechanically secured to the housing using an electromagnetic interference filter formed by the opening in the housing and the receptacle, thereby obviating a need for a dedicated attachment to the housing. During manufacture, one or more parameters may be set based on coupling to another device. For example, diameter 440-1 may be fixed based on a design for the optical subassembly and/or a component coupled thereto. However, diameter 440-2 may be varied during housing manufacture to achieve a configured cut-off frequency. Similarly, thickness 445 of the electromagnetic interference filter formed by diameters 440 may be varied during manufacture to achieve a configured attenuation value.

As indicated above, FIGS. 4A and 4B are provided merely as an example. Other examples are possible and may differ from what was described with regard to FIGS. 4A and 4B.

Figure 5:
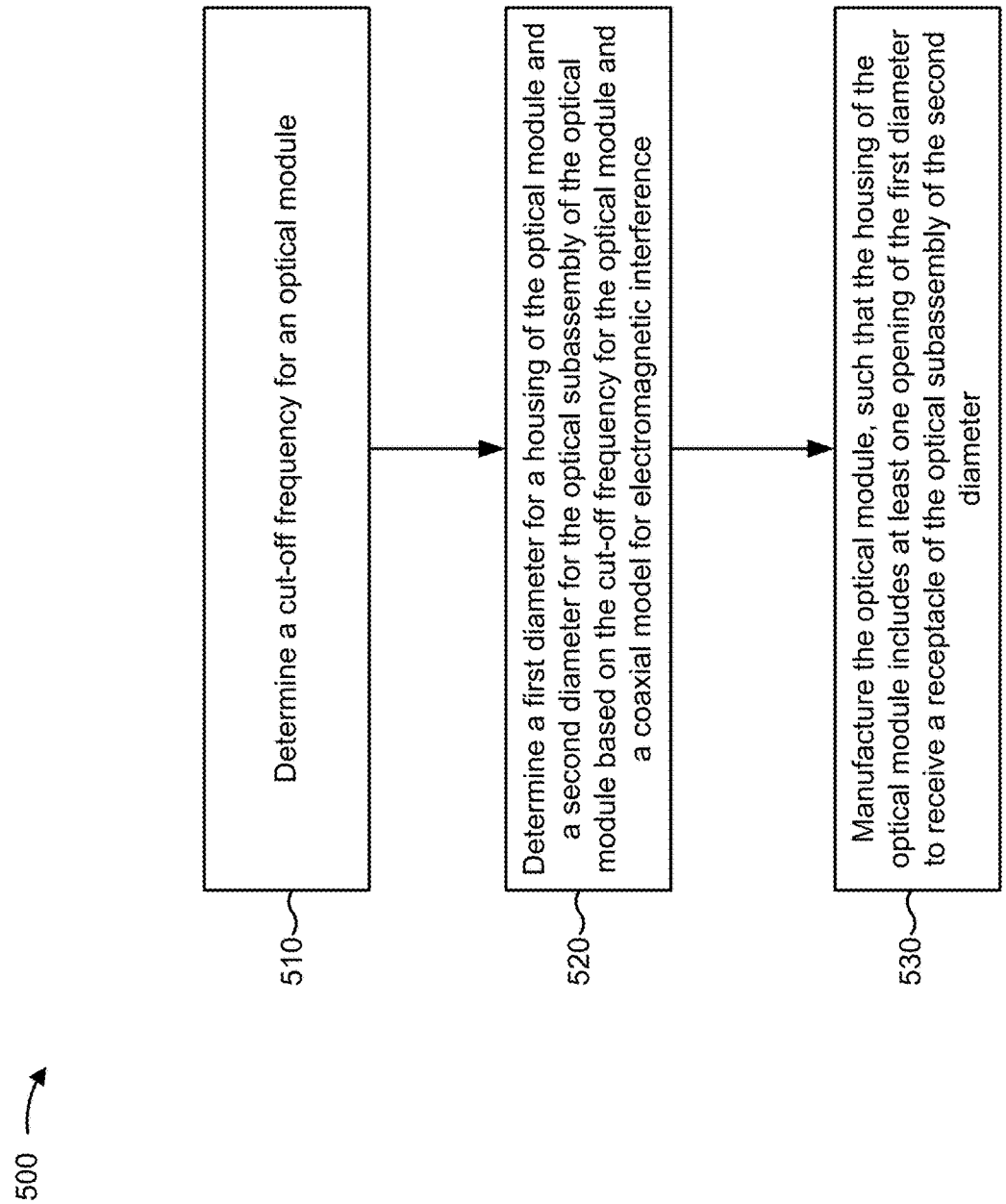
FIG. 5 is a flow chart of an example process for configuring example implementations described herein.

FIG. 5 is a flow chart of an example process 500 for configuring an optical module.

As shown in FIG. 5, process 500 may include determining a cut-off frequency for an optical module (block 510). For example, a controller may determine the cut-off frequency for the optical module. In some implementations, the controller may determine the cut-off frequency based on a set of criteria. For example, the controller may determine the cut-off frequency based on a design requirement, an expected operating frequency, and/or the like. In some implementations, a controller may perform an electromagnetic interference scan to determine the cut-off frequency. For example, the controller may determine a peak electromagnetic interference emission frequency for at least one component of the optical module (e.g., for an optical subassembly), and may determine the cut-off frequency such that the cut-off frequency is greater than the peak electromagnetic interference emission frequency. In this way, the cut-off frequency may be selected to suppress electromagnetic interference emission at the peak electromagnetic interference emission frequency. Additionally, or alternatively, the controller may determine a half-wavelength value for the peak electromagnetic interference emission frequency. In this case, the controller may cause the optical module to be manufactured with an offset of electromagnetic interference filters of optical subassemblies of the optical module such that the offset causes destructive interference to suppress electromagnetic interference emissions associated with the optical subassemblies at the peak electromagnetic interference emission frequency. In some implementations, the controller may determine the cut-off frequency based on a second harmonic frequency of a highest data rate of a component of the optical module (e.g., an optical subassembly).

In some implementations, the controller may be a processor executing software instructions stored by a non-transitory computer-readable medium, such as a memory and/or a storage component. A computer-readable medium is defined herein as a non-transitory memory device. A memory device includes memory space within a single physical storage device or memory space spread across multiple physical storage devices. Additionally, or alternatively, hardwired circuitry may be used in place of or in combination with software instructions to perform one or more processes described herein. Thus, implementations described herein are not limited to any specific combination of hardware circuitry and software.

As further shown in FIG. 5, process 500 may include determining a first diameter for a housing of the optical module and a second diameter for the optical subassembly of the optical module based on the cut-off frequency for the optical module and the coaxial model for electromagnetic interference (block 520). For example, the controller may determine the first diameter and the second diameter. In some implementations, the controller may determine the cut-off frequency for the optical module based on a coaxial model of electromagnetic interference emissions. For example, the controller may determine a first diameter for a circular cross-section receptacle and a second diameter for a circular opening to receive the circular cross-section receptacle based on the cut-off frequency corresponding to the first diameter and the second diameter and using the coaxial model. In some implementations, the controller may determine one or more other parameters relating to the optical module. For example, the controller may determine a plurality of diameters for a receptacle of an optical subassembly of the optical module. In some implementations, the controller may determine a thickness of a circular opening to receive the receptacle. For example, the controller may configure a housing wall thickness of a housing wall that includes the circular opening to configure an amount of attenuation of electromagnetic interference emissions to less than a threshold.

In some implementations, the controller may determine a set of design criteria for causing a phase offset between optical subassemblies of the optical module. For example, the controller may determine an offset to a position of respective electromagnetic interference filters of respective receptacles of the optical subassemblies, an offset in a thickness of the respective electromagnetic interference filters, and/or the like. In this case, the offset may be a half-wavelength offset for a peak electromagnetic interference emission frequency to cause destructive interference between respective electromagnetic interference emissions of the optical subassemblies at the peak electromagnetic interference emission frequency.

As further shown in FIG. 5, process 500 may include manufacturing the optical module, such that the housing of the optical module includes at least one opening of the first diameter to receive a receptacle of the optical subassembly of the second diameter (block 530). For example, the controller may provide a set of design parameters to enable manufacture of the optical module. In some implementations, the controller may communicate with a fabrication device to cause the fabrication device to fabricate the optical module based on the set of design parameters, such as with a particular diameter for a circular opening of a housing of the optical module, with a particular diameter for a receptacle of an optical subassembly of the optical module, with a particular housing wall thickness, with a particular offset between electromagnetic interference filters, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, based on using a circular housing opening to receive a circular receptacle, an optical module may be associated with reduced electromagnetic interference emissions relative to other techniques for designing an optical module. Moreover, destructive interference may result from manufacturing the optical module with a phase offset between electromagnetic interference emissions by a first optical subassembly (e.g., a transmit optical subassembly) and a second optical subassembly (e.g., a receive optical subassembly). In this case, the destructive interference may be from the electromagnetic interference emissions of the first and second optical subassemblies, and may result in a reduction to a net electromagnetic interference emission of the optical module.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical module, comprising:
   an optical subassembly having a receptacle,
      the receptacle having a first diameter; and
   a housing having a circular opening for receiving the receptacle,
      the circular opening having a second diameter,
      wherein the first diameter and the second diameter are sized to reduce electromagnetic interference at a cut-off frequency from the optical module,
      wherein the cut-off frequency is defined by a data rate of at least one component of the optical module, and
      wherein the housing disposes a first electromagnetic interference filter of the optical subassembly offset from a second electromagnetic interference filter of another optical subassembly by a half wavelength for a peak electromagnetic interference emission frequency.

2. The optical module of claim 1, further comprising:
another optical subassembly having another receptacle with a third diameter,
wherein the housing includes another circular opening of a fourth diameter to receive the other receptacle,
wherein the third diameter and the fourth diameter are sized to reduce electromagnetic interference at the cut-off frequency.

3. The optical module of claim 1, wherein the optical subassembly is a transmit optical subassembly (TOSA) or a receive optical subassembly (ROSA).

4. The optical module of claim 1, wherein the electromagnetic interference is less than a threshold at a particular distance, and
wherein the threshold is at least one of:
100 decibel microvolts per meter (dBμV/m),
75 dBμV/m,
60 dBμV/m,
55 dBμV/m,
50 dBμV/m, or
45 dBμV/m.

5. The optical module of claim 1, wherein the cut-off frequency is less than a threshold, and
wherein the threshold is at least one of:
35 Gigahertz (GHz)
30 GHz,
28.05 GHz,
25.78 GHz, or
25 GHz.

6. The optical module of claim 1, wherein the first diameter is between 2.0 millimeters (mm) and 3.0 mm (inclusive), and
wherein the second diameter is between 3.0 mm and 5.0 mm (inclusive).

7. The optical module of claim 1, wherein a housing wall of the housing that includes the circular opening is associated with a particular thickness sized for a particular attenuation value, and
wherein the particular thickness is between at least one of:
0.5 millimeters (mm) and 7.5 mm (inclusive),
1 mm and 5 mm (inclusive), or
2.5 mm and 3.5 mm (inclusive).

8. The optical module of claim 1, wherein the circular opening includes a plurality of diameters, and
wherein a portion of a housing wall including the circular opening and with at least one of the plurality of diameters is configured to maintain the receptacle disposed in the circular opening.

9. The optical module of claim 1, wherein a gap between the receptacle and the circular opening contains air, a gas, or a dielectric material.

10. An optical module, comprising:
a first optical subassembly to optically couple to a first optical fiber;
a second optical subassembly to optically couple to a second optical fiber;
a housing with a plurality of circular openings;
a first electromagnetic interference filter associated with the housing and the first optical subassembly; and
a second electromagnetic interference filter associated with the housing and the second optical subassembly,
wherein the plurality of circular openings include a first circular opening to receive the first electromagnetic interference filter and a second circular opening to receive the second electromagnetic interference filter,
wherein a first length of the first electromagnetic interference filter is different from a second length of the second electromagnetic interference filter to cause a particular phase offset between the first optical subassembly and the second optical subassembly, and
wherein the particular phase offset is to cause first electromagnetic interference from the first optical subassembly to destructively interfere with second electromagnetic interference from the second optical subassembly such that a net electromagnetic interference from the optical module at a particular wavelength is less than a threshold amount.

11. The optical module of claim 10, wherein the particular phase offset is a 180 degree phase offset.

12. The optical module of claim 10, wherein the first optical subassembly and the second optical subassembly are offset by a distance corresponding to a half wavelength for the particular wavelength.

13. The optical module of claim 10, wherein a data rate is greater than a threshold, and
wherein the threshold is at least one of:
50 Gigabits per second (Gbps),
100 Gbps,
200 Gbps, or
400 Gbps.

14. The optical module of claim 10, wherein the particular wavelength is a peak wavelength for the first electromagnetic interference and the second electromagnetic interference.

15. The optical module of claim 10, wherein the first electromagnetic interference filter includes a first receptacle with a first diameter selected such that the first diameter and a second diameter of the first circular opening are sized to reduce emission of the first electromagnetic interference, and
wherein the second electromagnetic interference filter includes a second receptacle with a third diameter selected such that the third diameter and a fourth diameter of the second circular opening are sized to reduce emission of the second electromagnetic interference.

16. A method comprising:
determining a cut-off frequency for an optical module;
determining a first diameter for a housing of the optical module and a second diameter for an optical subassembly of the optical module based on the cut-off frequency for the optical module and a coaxial model for electromagnetic interference,
wherein the first diameter and the second diameter are selected such that electromagnetic interference emitted by the optical module is above the cut-off frequency;
performing an electromagnetic interference scan of the optical subassembly to determine a peak electromagnetic interference emission frequency; and
manufacturing the optical module, such that:
the housing of the optical module includes at least one opening of the first diameter to receive a receptacle of the optical subassembly of the second diameter, and
the housing disposes a first electromagnetic interference filter of the optical subassembly offset from a second electromagnetic interference filter of another optical subassembly by a half wavelength for the peak electromagnetic interference emission frequency, wherein the offset is configured to cause first electromagnetic interference emitted from the optical subassembly to destructively interfere with second electromagnetic interference emitted from the other optical subassembly for the peak electromagnetic interference emission frequency.

17. The method of claim 16, wherein determining the cut-off frequency comprises:

determining the cut-off frequency such that the cut-off frequency is greater than the peak electromagnetic interference emission frequency.

18. The method of claim 16, wherein determining the cut-off frequency comprises:

determining the cut-off frequency based on a second harmonic frequency of a highest data rate of the optical subassembly.

19. The method of claim 16, further comprising:

determining an attenuation value for reducing electromagnetic interference emitted by the optical module;

determining a thickness for a housing wall of the housing based on the attenuation value, wherein the housing wall corresponds to a portion of the housing that includes the at least one opening; and wherein manufacturing the optical module comprises:

manufacturing the optical module such that the housing wall is of the determined thickness.

20. The method of claim 16, wherein the optical module is further manufactured such that:

the other optical subassembly includes another receptacle with a third diameter, the housing includes circular opening of a fourth diameter to receive the other receptacle, and the third diameter and the fourth diameter are sized to reduce the electromagnetic interference emitted by the optical module.

* * * * *